Patented Mar. 28, 1939

2,151,788

UNITED STATES PATENT OFFICE

2,151,788

ACID ADDITION COMPOUNDS OF HIGHER FATTY ACID AMIDES

Ernst Alfred Mauersberger, Maarssen, Netherlands, assignor to Alframine Corporation, New York, N. Y., a corporation of New York No Drawing. Application October 15, 1937, Serial No. 169,232

7 Claims. (Cl. 260—404)

My invention relates to softening agents, and to the method of producing the same, particularly applicable for use in the textile, leather and allied industries.

According to my invention, I produce acid addition compounds from water soluble organic acids and aliphatic amines, the chain of which is interrupted by a COO-group.

Upon reacting fatty acids, their anhydrides and chlorides with alkylolamines, an amide is produced the side chain of which contains the hydroxyl group. The reaction may be expressed as follows:

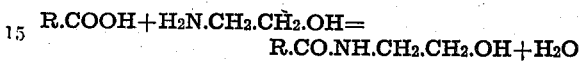

R.COOH + H$_2$N.CH$_2$.CH$_2$.OH = R.CO.NH.CH$_2$.CH$_2$.OH + H$_2$O

These reaction products are insoluble in water and in diluted organic and inorganic acids, and if it be desired to render them soluble they must be subjected to a sulfonating process. Upon subjecting such products to sulfonation, water soluble sulfonates are obtained which have good washing, wetting and penetrating properties but are wholly lacking in softening action; as a matter of fact they display the properties of sulfonated fatty alcohols.

The principal object of my invention is to impart to the reaction products first mentioned, i. e., the amides, excellent softening properties, and I accomplish this object by converting the amides into amines, the conversion being effected by reacting the amides at temperatures over 100° C. with organic, water soluble low molecular acids. The product resulting from the conversion is an acid addition compound easily and clearly soluble in water. When such acid addition compound is in solution, the base may be separated from the solution by means of diluted alkalies and such base may again be brought into solution by means of diluted acids. The conversion reaction is probably as follows:

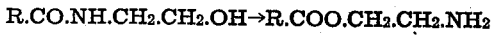

R.CO.NH.CH$_2$.CH$_2$.OH → R.COO.CH$_2$.CH$_2$.NH$_2$

Presumably, the organic acid is first esterified with the hydroxyl group of the amide and then the rearrangement of the molecules occurs at higher temperatures.

The starting material for my invention may, for example, be the product of reacting monoethanolamine with oleic acid under pressure at 200° C., the amide having the following formula: C$_{17}$H$_{33}$.CO.NH.CH$_2$.CH$_2$.OH. Upon mixing the reaction product with an 85% lactic acid, a clear solution of the two components is obtained, but the solution dissociates immediately upon the addition of water thereto. If the solution be heated to 100° C. the amide also separates out on the addition of water because no reaction of any kind has occurred, but if the solution be heated to 140° C., and maintained at this temperature for about one half hour, a product is obtained which is wholly soluble in cold water. When this product is in a water diluted solution, the base may be separated from the latter by means of diluted alkalies and this base may be caused to go into solution by the addition of lactic acid or any other organic acid thereto. A peculiar phenomenon observed in this procedure is that upon the addition of sulphuric acid or other sulfate solution, as for example Glauber's salt, a precipitate of an unknown composition separates out.

Stated in general terms, the starting materials which I employ are the amides which are produced by reacting mono-alkylolamine with a fatty acid, the latter being recovered from fats and oils of vegetable or animal nature, and the amides being obtained by reacting the fatty acids as such or in the form of their anhydrides or chlorides, with the alklolamines. The latter reaction may be effected in the presence of heat and pressure. The amides which I use as starting materials have the following general formula: R$_1$.CO.NH.R$_2$.OH in which R$_1$ is any saturated or unsaturated aliphatic radical containing at least 8 carbon atoms, and which may also contain a hydroxyl group, and R$_2$ is a short aliphatic chain containing not more than 5 carbon atoms.

The water soluble, organic acids which I employ for the conversion of the amides into amines are the lower aliphatic acids such as formic acid, acetic acid, etc.; the dicarboxylic acids such as oxalic acid, tartaric acid; the oxycarboxylic acids such as lactic acid, etc. I may also use aromatic acids such as benzoic acid or salicylic acid although, as a practical matter, I prefer to use lactic acid in all cases because with its use no pressure is required, the cost thereof is low and the workers suffer no discomfort or inconvenience from bad odors.

It is preferable to employ the selected acid in molecular equivalent quantities and, generally, it should be as nearly anhydrous as possible in order that a solution of the amide in the acid take place. When the amide-acid solution has been formed it is heated up to 140° C., the heating being effected under pressure in a closed receptacle if the aliphatic acid has a low boiling point, and this temperature is maintained for about one-half hour, whereupon the product is cooled. If the acid used was fluid, the reaction product is generally a viscid oil which is soluble in cold water. When this oil is placed in water a very viscid oil first forms, then with the addition of more water a paste-like body forms which is somewhat of the consistency of shaving cream. If more water is added the paste-like body takes on the characteristics of a jelly and in the case of strong dilution the jelly is converted into a solution having no viscosity. This solution has good wetting properties, foams readily and is an excellent softening agent for wool, acetate silk and natural silk. The solution has no particular washing action, and is usable as a finisher in the textile and leather industries.

*Example 1*

675 grams of an amide, produced by heating 550 grams of olein with 135 ccm. of monoethanolamine to a temperature of 210° C., are heated to 140° C., with 240 ccm. of an 85% lactic acid, the reaction mass maintained at 140° C., for about one-half hour and then cooled. The resulting product is a thick, highly viscid reddish brown oil which, upon dilution with water, first turns into a shaving-cream-like paste, then into a jelly and finally into a clear solution without appreciable viscosity.

To impart a very soft hand to acetate silk, the latter is passed through a bath consisting of warm water containing a 3% solution of the product. The silk is immediately wetted. The excess liquid is expressed or removed from the silk by rubber rolls and the silk, which now have a very full and soft hand, is dried.

*Example 2*

450 grams of cocoa fatty acid and 120 ccm. of monoethanolamine are vigorously stirred together resulting in the production of a soap-like solid body, which is then heated to 220° C., in an autoclave causing the pressure in the latter to rise to about 120 pounds. The liberated water of reaction is blown off. The reaction product is a hard, wax-like amide, pure white in color, which slowly turns brown in the air. 450 grams of this amide are heated to 130° C. with 200 grams of an 80% lactic acid and this temperature is maintained for about one hour. The reaction product is a completely water soluble oil. In the present case, in contradistinction to the product of Example 1, no shaving-cream-like mass but a white paste is produced if this lactic acid salt is diluted with water and treated as in Example 1.

A 2% solution of this acid addition compound is effective to soften dyed skins and chrome leather, the skins or leather being treated in the solution, the excess solution removed by pressure or centrifugal action and the skin or leather then dried in warm air.

*Example 3*

450 grams of ricinoleic fatty acid and 110 ccm. of monoethanolamine are heated to 200° C. in an autoclave and the liberated water of reaction is discharged. The reaction product is a hard, white wax-like body which becomes brown in the air.

450 grams of this reaction product and 150 ccm. of a 98% acetic acid are heated for one hour in an autoclave to a temperature of 130° C.; cooling is then effected and the resulting product is readily soluble in cold water yielding a somewhat slimy solution.

Natural silk, when treated with a 1% solution of this acetic acid salt, and then dried, presents a full, soft and flowing hand.

I claim:

1. As a new compound, a water soluble acid addition compound consisting of the product resulting from the reaction at temperatures of about 140° C., of a lower molecular weight water soluble carboxylic acid with a product having the general formula $R_1.CO.NH.R_2.OH$, in which $R_1$ is an aliphatic chain of at least 8 carbon atoms and $R_2$ is an aliphatic chain of not more than 5 carbon atoms.

2. The compound of claim 1, in which $R_1$ is an aliphatic unsaturated chain.

3. The compound of claim 1, in which $R_1$ is an aliphatic chain which contains one hydroxyl group.

4. The herein described method of producing new finishing compounds, which method comprises reacting at temperatures of about 140° C., a lower molecular weight water soluble carboxylic acid with a product having the general formula $R_1.CO.NH.R_2.OH$, in which $R_1$ is an aliphatic chain of at least 8 carbon atoms in the molecule and $R_2$ is an aliphatic chain of not more than 5 carbon atoms and continuing said reaction for approximately one half hour whereby the reaction product is recovered in soluble form.

5. The method of claim 4, in which $R_1$ is an aliphatic unsaturated chain.

6. The method of claim 4, in which $R_1$ is an aliphatic chain containing one hydroxyl group.

7. The method of claim 4, in which the lower molecular weight water soluble carboxylic acid is an aromatic carboxylic acid.

ERNST ALFRED MAUERSBERGER.